Patented Aug. 3, 1937

2,088,622

UNITED STATES PATENT OFFICE 2,088,622

FLAVORING MATERIAL

William E. Stokes, Brooklyn, and John Michael Wenneis, St. Albans, N. Y., assignors, by mesne assignments, to Standard Brands Incorporated, New York, N. Y., a corporation of Delaware No Drawing. Application March 24, 1933,
Serial No. 662,577

20 Claims. (Cl. 99—140)

The invention relates to a flavoring material and to a method for its preparation. More particularly it relates to a flavoring material suitable for gelatin desserts, and includes correlated improvements and discoveries whereby the desired properties of such a flavoring material are enhanced.

Essential oils, such as those of lemon, orange, lime, etc., upon exposure to air, undergo change and acquire an undesirable and disagreeable odor and taste like unto that of turpentine, which makes the oil unsuitable for use in the manufacture of edible products. In order to overcome this change in character attempts have been made to deterpenate the oils by various processes, such as distillation, for the purpose of removing the terpenes. Such oils are an article of commerce and are designated as terpeneless oils.

The oils which have been deterpenated are deficient in flavor as compared with the untreated or natural oils inasmuch as the treatment required to make the terpeneless oil also removes or injures valuable flavoring constituents. If an untreated oil is used in the manufacture of a flavored edible product, such product is much better in flavor, odor and aroma when fresh than a product prepared from a terpeneless oil. However, the product prepared with the natural oil rapidly changes and acquires a disagreeable odor.

It is an object of this invention to provide a flavoring material in which foregoing disadvantages are not present and a method for its preparation.

Another object of the invention is to provide a flavoring material possessing good keeping qualities and an improved flavor, and which may be readily and efficiently produced on a commercial scale.

An additional object of the invention is to provide a flavoring material which is formed from an emulsion and has a protective film thereon when dry, whereby liberation of the mulsified flavor and its volatility and/or change in character is prevented.

A further object of the invention is to provide a process for the preparation of a flavoring material which entails emulsifying a flavor in the presence of an emulsifying agent, with inclusion of a flavor volatility reducent, and an edible hygroscopic agent, and then drying the emulsion.

A still further object of the invention is to provide a flavoring material containing a flavor of natural origin which retains its characteristic flavor over an extended period of time.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

In the practice of the invention a flavoring material may be prepared by forming an emulsion, preferably an aqueous emulsion and with the aid of an emulsifing agent, containing a flavor which may be natural or synthetic and a flavor volatility reducent in the dispersed phase. The emulsion may contain also an edible hygroscopic agent in the disperse phase. More particularly, the flavoring material may be prepared by admixing an emulsifying agent, for example, gelatin, albumen, an oleate, a gum, or a suitable mixture thereof, etc., with water, adding thereto an edible hydroscopic agent, and then introducing a flavor in conjunction with a flavor volatility reducent. If desired, the emulsion so produced may be dried.

The flavor entering into the preparation of the emulsion may be a natural flavoring material such as oil of lemon, oil of orange, oil of lime, natural fruit flavors as strawberry, raspberry, cherry, etc., or a synthetic flavor, as oil of wintergreen, ethyl acetate, ethyl malate, amyl acetate, etc. The method is especially adapted for the preparation of a flavoring material containing a flavor which is characterized either by undergoing change by contact with air, or by having a rather high volatility. The flavor volatility reducent has the effect of lowering the volatility of the flavor whereby liberation thereof from the emulsion and loss due to volatilization are prevented. Generally the reducent comprises an edible organic substance, other than a fatty oil having a boiling point higher than that of the flavor, is insoluble in water, and does not influence the desired flavor. Thus, if ethyl acetate were used as a flavor, the volatility reducent may be a higher boiling alcohol. Among the substances which may be employed, mention more particularly may be made of edible derivatives of organic acids as the higher boiling point alcohols, such as n-octyl, sec-octyl, nonyl, di-n-butyl, carbinol, phenyl ethyl alcohol, phenyl propyl alcohol, phenyl butyl alcohol, and esters of high boiling point organic acids, for example tartaric, malonic, malic, citric, succinic, in which the hydrogen of one or more of the carboxyl groups has been replaced by an ester group, specifically, the methyl, ethyl, propyl, isopropyl, butyl, isobutyl, etc. esters of these acids. Utilization may also be made of esters belonging to the aromatic series of organic compounds, as benzyl benzoate and benzyl salicylate; of ethers as di-n-amyl, di-iso-amyl, di-hexyl, di-benzyl, di-phenylethyl, etc.; of ketones, e. g., dibutyl, diamyl, benzophenone, etc., and aldehydes, as p-methoxy benzaldehyde, p-methoxy cinnamic aldehyde, etc.

Ethers and esters have the following general formula R—O—R', in which R is a hydrocarbon radical or an acyl radical, and R' a hydrocarbon radical, while ketones and aldehydes have the general formula

in which R represents a hydrocarbon radical and R' a hydrocarbon radical or hydrogen.

A flavoring material thus produced may be used in the form of the emulsion, or the emulsion may be first dried and then admixed with the product to which it is desired to impart a flavor. The drying of the emulsion may be effected in any manner which does not affect the flavoring properties of the material. Thus, for example, it may be dried in a vacuum dryer, or by spray drying, or by the addition of an edible dehydrating agent which absorbs water from the water phase of the emulsion.

In order to accomplish the formation of a protective film about the emulsoid when the flavoring material is dried, and thereby prevent liberation of the emulsion and possible deterioration of the flavor, there is utilized an edible hygroscopic agent. This may be a carbohydrate possessing hygroscopic properties, and more specifically invert sugar, glucose, maltose, and glycerine and diethylene glycol.

As an illustrative embodiment of a manner in which the flavoring material may be prepared, the following example is presented. Granulated, or pulverized gelatin in an amount of about 0.6 part is dissolved in about 7 parts of water. To this solution there is then added about 7 parts of invert sugar, and an admixture of about 3.4 parts of oil of lime and 1.5 parts of ethyl succinate. The admixture so obtained is now placed in an emulsifier, and emulsified in the usual manner. When the emulsion has been formed the flavor is adapted for incorporation in a dessert mixture, as for example, a gelatin dessert, or it may be dried and subsequently admixed with the ingredients of a dessert or other flavored composition.

The emulsion may be dried in a vacuum dryer, or by spray drying, or preferably, by the use of an edible dehydrating agent, as a carbohydrate possessing dehydrating properties, specifically anhydrous corn sugar which has the property of taking up approximately 10% of its weight of water. Such a dehydrating agent absorbs water from the water phase of the emulsion and gives a dry material characterized by having a protective film about the emulsoid which protects it from contact with air, and prevents liberation of the emulsified oil, or flavor. The drying of the emulsion may be accomplished also by the addition of other dehydrating agents, of which mention may be made of granulated or pulverized gelatin, lactose, maltodextrin, etc.

A flavoring material prepared in accordance with the foregoing procedure is of improved flavor and may be kept for considerable periods of time without deterioration. The addition of the hygroscopic substances prevents rupture of the emulsoid with consequent liberation of the flavor, and the flavor volatility reducent effects a lowering of the volatility of the flavor, thus reducing internal stresses and adding to the retention thereof within the material. The flavoring material may be of any desired flavor. It may be used in the manufacture of flavored edible products, and when so used the products will retain the original flavor with substantially no loss or change therein for a period which may be three times as long as that of a similar product prepared with the usual flavoring materials. These flavors are especially well adapted for use in the production of gelatin desserts. Gelatin desserts may be prepared therewith by admixing the gelatin and sugar and then adding the flavoring material, either as an emulsion, the water being taken up by the gelatin content, or by introducing it in the dry form and blending therewith by a mixing operation.

Since certain changes in carrying out the above method and certain modifications in the flavoring material which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A method for the preparation of a flavoring material which comprises emulsifying a flavor with the inclusion of an ester having a boiling point higher than that of said flavor, and a carbohydrate possessing hygroscopic properties.

2. A method for the preparation of a flavoring material which comprises emulsifying a flavor with the inclusion of an ester of a high boiling point organic acid and a carbohydrate possessing hygroscopic properties, and then drying.

3. A method for the preparation of a flavoring material which comprises emulsifying a flavor with the inclusion of an ester of a high boiling point organic acid and a carbohydrate possessing hygroscopic properties, and then drying by means of an edible dehydrating agent.

4. A method for the preparation of a flavoring material which comprises emulsifying a natural flavor in the presence of an emulsifying agent with the inclusion of ethyl succinate and invert sugar, and then drying by means of anhydrous corn sugar.

5. A method for the preparation of a flavoring material which comprises forming an emulsion containing a natural flavor and an ester of a high boiling point organic acid in the dispersed phase, invert sugar in the disperse phase, and drying by means of anhydrous corn sugar.

6. A method for the preparation of a flavoring material which comprises forming a solution of gelatin, water and invert sugar, adding thereto an admixture containing a natural flavor and ethyl succinate, emulsifying the mixture thus obtained, and drying by means of anhydrous corn sugar.

7. A dried flavoring material comprising an emulsified flavor, an ester of a high boiling point organic acid, and a carbohydrate possessing hygroscopic properties.

8. A dried flavoring material which comprises an emulsified natural flavor, ethyl succinate, invert sugar, and anhydrous corn sugar.

9. A method for the preparation of a flavoring material which comprises forming an emulsion containing a flavor and an edible derivative of an organic acid which has a boiling point higher than that of the flavor, is insoluble in water and does not affect the desired flavor as a flavor volatility reducent in the dispersed phase and a carbohydrate possessing hygroscopic properties in the disperse phase, and drying said emulsion.

10. A method for the preparation of a flavoring material which comprises forming a solution of gelatin, water and invert sugar, adding thereto an admixture containing a flavor and an edible derivative of an organic acid which has a boiling point higher than that of the flavor, is insoluble in water and does not affect the desired flavor as a flavor volatility reducent, then emulsifying the mixture thus obtained, and drying the emulsion so produced.

11. A dried flavoring material comprising an emulsified flavor, an edible derivative of an organic acid which has a boiling point higher than that of the flavor, is insoluble in water and does not affect the desired flavor as a flavor volatility reducent, and a carbohydrate possessing hygroscopic properties.

12. An emulsified dried flavoring material which comprises a natural flavor and ethyl succinate.

13. A method for the preparation of a flavoring material, which comprises emulsifying a flavor with the inclusion of a high boiling point alcohol which has a boiling point higher than that of the flavor, is insoluble in water and does not influence the desired flavor, said alcohol functioning as a flavor volatility reducent.

14. A method for the preparation of a flavoring material, which comprises emulsifying a flavor with the inclusion of a high boiling point oxygen containing organic compound having not more than 16 carbon atoms and the general formula R—O—R', in which R represents a hydrocarbon radical and an acyl radical, and R' is a hydrocarbon radical, said compound having a boiling point higher than that of the flavor, being insoluble in water and without influence upon the desired flavor, said compound functioning as a flavor volatility reducent.

15. A method for the preparation of a flavoring material, which comprises emulsifying a flavor with the inclusion of a high boiling point oxygen containing organic compound having the following general formula

in which R represents a hydrocarbon radical and R' hydrogen and a hydrocarbon radical, said compound having a boiling point higher than that of the flavor, being insoluble in water and without influence upon the desired flavor, said compound functioning as a flavor volatility reducent.

16. A flavoring material comprising an emulsion containing a high boiling point oxygen containing organic compound having not more than 16 carbon atoms and the following general formula R—O—R', in which R represents a hydrocarbon radical and an acyl radical, and R' is a hydrocarbon radical, said compound having a boiling point higher than that of the flavor, being insoluble in water and without influence upon the desired flavor, said compound functioning as a flavor volatility reducent.

17. A flavoring material comprising an emulsified flavor and a high boiling point oxygen containing organic compound having not more than 16 carbon atoms and the general formula R—O—R', in which R represents a hydrocarbon radical and an acyl radical, and R' is a hydrocarbon radical, said compound having a boiling point higher than that of the flavor, being insoluble in water and without influence upon the desired flavor, said compound functioning as a flavor volatility reducent.

18. A flavoring material comprising an emulsified flavor and a high boiling point alcohol which has a boiling point higher than that of the flavor, is insoluble in water and does not influence the desired flavor, said alcohol functioning as a flavor volatility reducent.

19. A flavoring material comprising an emulsified flavor and a high boiling point oxygen containing organic compound having the general formula

in which R represents a hydrocarbon radical and R' hydrogen and a hydrocarbon radical, said compound having a boiling point higher than that of the flavor, being insoluble in water and without influence upon the desired flavor, said compound functioning as a flavor volatility reducent.

20. An emulsified dried flavoring material comprising a flavor and a high boiling point oxygen containing organic compound having not more than 16 carbon atoms and the general formula R—O—R', in which R represents a hydrocarbon radical and an acyl radical, and R' is a hydrocarbon radical, said compound having a boiling point higher than that of the flavor, being insoluble in water and without influence upon the desired flavor, said compound functioning as a flavor volatility reducent.

WILLIAM E. STOKES.
JOHN MICHAEL WENNEIS.